US008888155B2

(12) United States Patent
Nommensen et al.

(10) Patent No.: US 8,888,155 B2
(45) Date of Patent: Nov. 18, 2014

(54) HOOK

(75) Inventors: Arthur C. Nommensen, Norman Park (AU); Murray Bragg, Brisbane (AU)

(73) Assignee: Happy Captain Pty Ltd., Norman Park (AU)

( * ) Notice: Subject to any disclaimer, the term of this patent is extended or adjusted under 35 U.S.C. 154(b) by 0 days.

(21) Appl. No.: 13/983,496

(22) PCT Filed: Jun. 1, 2012

(86) PCT No.: PCT/AU2012/000628
§ 371 (c)(1),
(2), (4) Date: Jan. 29, 2014

(87) PCT Pub. No.: WO2012/162756
PCT Pub. Date: Dec. 6, 2012

(65) Prior Publication Data
US 2014/0132016 A1 May 15, 2014

(30) Foreign Application Priority Data
Jun. 2, 2011 (AU) ................................ 2011902171

(51) Int. Cl.
B66C 1/34 (2006.01)
B25J 15/00 (2006.01)
B63B 21/54 (2006.01)
F16B 45/02 (2006.01)

(52) U.S. Cl.
CPC ............. *B25J 15/0019* (2013.01); *B63B 21/54* (2013.01); *F16B 45/02* (2013.01)
USPC ..................................... 294/82.19; 294/82.17

(58) Field of Classification Search
USPC ............ 294/82.19, 82.33, 82.2, 82.31, 82.34, 294/82.21, 66.1, 82.17, 82.18, 82.22, 294/82.32; 24/599.4, 599.1, 599.9
See application file for complete search history.

(56) References Cited

U.S. PATENT DOCUMENTS 1,554,841 A * 9/1925 Clark .......................... 294/82.19
3,813,122 A 5/1974 Wemyss
(Continued)

FOREIGN PATENT DOCUMENTS

CA 2651601 7/2009

*Primary Examiner* — Saul Rodriguez
*Assistant Examiner* — Gabriela Puig
(74) *Attorney, Agent, or Firm* — Weisun Rao; Robbie R. Harmer; Greenberg Traurig, LLP

(57) ABSTRACT

A hook for manipulation of lines, the hook comprising an aduncate body, the body defining an opening between at least two portions thereof, the body further comprising a first shaped opening including an entry of a first dimension and an enlarged portion of a second dimension, wherein the second dimension is larger than the first dimension, a second shaped opening including an entry of a first dimension and an enlarged portion of a second dimension, wherein the second dimension is larger than the first dimension, the respective entries to the first and second shaped openings oriented in different directions, the hook further comprising a shuttle including a first retention pin, a second retention pin and a spacing body to space the first retention pin and the second retention pin from one another, the first retention pin shaped to pass the entry of the first shaped opening when oriented in a first position and to be prevented passage when not in the first position and the second retention pin shaped to pass the entry of the second shaped opening when oriented in a first position and to be prevented passage when not in the first position.

3 Claims, 11 Drawing Sheets

(56) References Cited

U.S. PATENT DOCUMENTS

| | | | |
|---|---|---|---|
| 4,195,872 A * | 4/1980 | Skaalen et al. | 294/82.19 |
| 4,528,729 A * | 7/1985 | Schmidt et al. | 24/599.4 |
| 5,292,160 A | 3/1994 | Deichman | |
| 5,322,334 A | 6/1994 | Hammer | |
| 5,881,601 A | 3/1999 | Hammer | |
| 7,757,360 B1 * | 7/2010 | Hong | 24/600.1 |
| 7,946,006 B2 * | 5/2011 | Thompson | 24/599.1 |
| 8,572,819 B2 * | 11/2013 | Yang | 24/599.5 |

\* cited by examiner

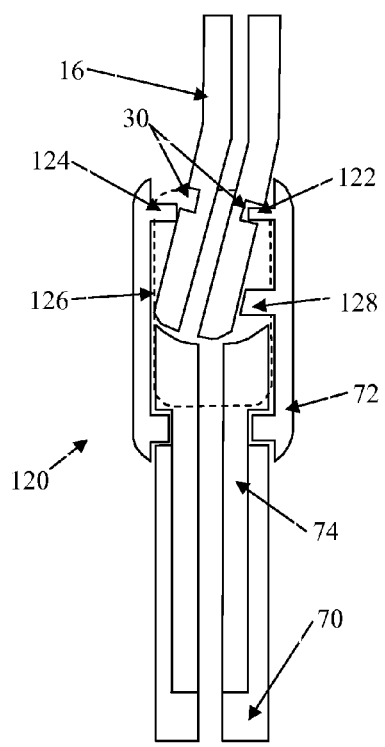
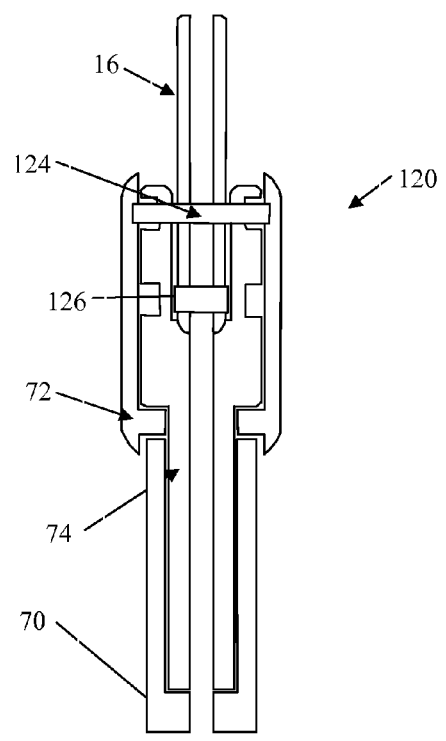
Figure 9           Figure 10
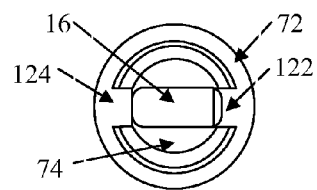
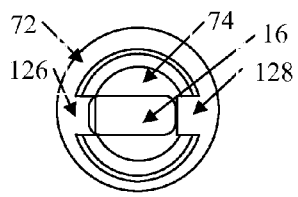
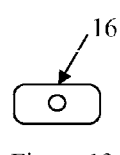
Figure 11     Figure 12     Figure 13

HOOK

CROSS REFERENCE TO RELATED APPLICATIONS

This application claims priority from International Application No. PCT/AU2012/000628, filed on Jun. 1, 2012, which in turn claim priority from Australian Application No. 2011902171, filed on Jun. 6, 2011, both of which are incorporated herein by reference in their entireties.

FIELD OF THE INVENTION

The present invention relates generally to a hook. In some embodiments, the invention is directed to a boating hook. In further embodiments the invention is directed to an extendable handle for a hook, although the scope of the invention is not necessarily limited thereto.

BACKGROUND

Boating hooks are available in the marketplace and are used for a variety of odd jobs in a marine setting including locating a line over a piling, recovering an object dropped overboard and picking up ropes and moorings. A problem with existing boating hooks is that it is very difficult to use the boating hook to 'thread' a line (such as a rope or a cable for example) around or through an object. In some instances the inability to 'thread' a line around or through an object can lead to dangerous situations where a crew member is required to leave the boat in order to thread a line through a mooring ring or dock fitting or at least balance in a precarious and dangerous position whilst doing so.

Hooks with shuttle mechanisms have been used to 'thread' ropes around or through an object. However, a disadvantage with existing shuttle mechanisms is that the shuttle mechanism is prone to unintended detachment from the hook, fragile and/or is vulnerable to corrosion. Another disadvantage is that due to the arrangement between the hook and the shuttle mechanism, the hook is unable to effectively pick up smaller items such as ropes or ring loops that are abutting flat surfaces. Still further, when the hook is used without the shuttle mechanism, the hook is encumbered with fittings that can poke, slip, block or break inappropriately.

Extendable handles for hooks are available in the marketplace, however, a disadvantage with existing extendable handles is that the extension/retraction mechanism is complex, fragile and vulnerable to corrosion, making them unsuitable for use in certain circumstances (eg use for boat hooks). For example, some extendable handles use a steel spring mechanism such as that found in a tape measure to push the handle out and pull the handle in, these types of mechanisms are complex, fragile and vulnerable to corrosion. Other extendable handles do not have a mechanism to push and pull the extension parts and instead are more labour intensive to use, using "spring mounted pins" on one extension part, which drop to stop-holes in another extension part, or cam locks that are required to be locked into position once each extension part has been manually extended.

It is an aim of the invention to provide a hook and/or extendable handle which overcomes or ameliorates one or more of the disadvantages or problems described above, or which at least provides the consumer with a useful or commercial choice.

It will be clearly understood that any reference herein to background material or information, or to a prior publication, does not constitute an admission that any material, information or publication forms part of the common general knowledge in the art, or is otherwise admissible prior art, whether in Australia or in any other country.

DESCRIPTION OF THE INVENTION

In one aspect, the present invention provides a hook for manipulation of lines, the hook comprising an curved body, the body defining an opening between at least two portions thereof, the body further comprising a first shaped opening including an entry of a first dimension and an enlarged portion of a second dimension, wherein the second dimension is larger than the first dimension, a second shaped opening including an entry of a first dimension and an enlarged portion of a second dimension, wherein the second dimension is larger than the first dimension, the respective entries to the first and second shaped openings oriented in different directions, the hook further comprising a shuttle including a first retention pin, a second retention pin and a spacing body to space the first retention pin and the second retention pin from one another, the first retention pin shaped to pass the entry of the first shaped opening when oriented in a first position and to be prevented passage when not in the first position and the second retention pin shaped to pass the entry of the second shaped opening when oriented in a first position and to be prevented passage when not in the first position.

No particular limitation should be placed on the invention by the use of the words 'line' or 'lines'. A line may be chain, rope, string, cord, yarn, fibre, wire, cable, tether, an elongate flexible member, ribbon, tape, strap and/or the like.

In one embodiment, the hook preferably has a curved body which defines an opening between two portions of the body. Preferably the body has an aduncate (hook shaped) shape although the body may be of any suitable shape. A skilled addressee will understand that aduncate shape means that any suitably shaped body may be used provided that the body defines an opening between two portions of the body. Typically, the body will be substantially curved when viewed from the side. Normally, the body will comprise an internal surface (disposed between at least two portions of the body) and an external surface. Preferably the throat of the opening will be a longer dimension than the gape of the opening. In a preferred embodiment, the hook is substantially drepaniform (sickle shaped) in shape.

The body may comprise at least one free end with a point on at least one portion of the body. If the body includes a point on at least one portion of the body, the point may assist in the manipulation of objects. The point will typically be formed by tapering one of the portions. The point may be shaped to allow better manipulation of objects. For example, the point could be a blunt point or a sharp point. Preferably, the point will be rectangular in cross section having a pair of flattened sides and a wedge shaped free end.

Typically, the body will comprise a neck portion. The neck portion may also be referred to as a shank. Preferably the neck portion is located toward one end of the body. Normally, if the body comprises a point towards one end of the body, the neck portion is located towards the other end of the body. Alternatively the neck portion may be located on any part of the body. The neck portion is typically elongate.

Normally the neck portion comprises a hook attachment means to attach the hook to an object such as a handle. The hook attachment means is preferably a section of different dimension, usually smaller dimension, on the neck portion which operatively engages to a member (such as a handle). For example the constriction may engage with a locking ring to attach the hook to a handle. Preferably, the section of different dimension will be provided as one or more notches in the neck portion such that a portion of the neck portion will have a smaller dimension in one axis than the normal dimension in other axes. This allows insertion into an opening which has a corresponding shape, for example a tubular passage with one or more flattened protrusions in the passage to allow the neck portion to pass when aligned one way and to be locked therein when the smaller dimension portion is rotated away from the alignment.

Alternatively, other attachment means may be provided. For example, the attachment means may be a threaded engagement, friction fit, and engagement involving (a) fastener(s), glue, and/or magnetic engagement to attach the hook to a member. No particular limitation should be placed on the invention by the type of attachment means used. A person skilled in the art will understand that appropriate attachment means which are known in the art can be utilised.

Alternatively, the neck portion may be formed with or engages with a member, for example a handle. Alternatively, the hook attachment means may be provided on any part of the body, or the body may be formed with or engages with a member, for example a handle. The member may be any suitable object and does not necessarily have to be a handle. Any suitably member may be used provided that when the hook is attached to, formed with and/or engages with the member, a line and/or other object may be manipulated by and/or manipulate the hook, In another embodiment, the neck is attached to a member (such as a handle) by a locking ring. The neck of the body may be angled relative to the orientation of the hook and an insert slot on the locking ring may be angled and/or effectively angled (e.g. through use of detents in the locking ring) relative to the locking ring. In this manner, when the neck and locking ring are engaged (i.e. part of the neck portion is inserted into the insert slot of the locking ring) in a first orientation, the angle between the handle and the relative orientation of the hook may be greater than when the neck and locking ring are engaged in a second orientation. For example, the neck may be disposed at 10° relative to a general orientation of the hook and the insert slot on the locking ring may be disposed at 10° relative to the locking ring. it will be apparent to a person skilled in the art that in a first position the general orientation of the hook will be disposed at 20° (i.e. 10° plus 10°) relative (longitudinally) to the locking ring (and therefore relative to a member such as a handle) and in a second position the hook will be disposed at 0° (i.e. 10° minus 10°) relative (longitudinally) to the locking ring.

In one embodiment, the locking ring may comprise a plurality of detents each of which is located at a different position relative to the locking ring. In this manner, the relative angle between the hook and the member (such as a handle) may be further adjusted by operatively engaging the hook (e.g. the neck portion) to a detent at a different position.

In another embodiment, the first shaped opening includes an entry of a first dimension and an enlarged portion of a second dimension. Preferably the second dimension is larger than the first dimension. Typically the enlarged portion of the first shaped opening is circular in shape when viewed from the side to enable smooth rotation of the first retention pin (of the shuttle) relative to the enlarged portion. Typically the first shaped opening is located towards the portion where the internal surface transitions to the neck portion.

Alternatively the enlarged portion of the first shaped opening may be of any suitable shape. A skilled addressee will understand that any suitable shaped enlarged portion of the first shaped opening may be used provided that the first retention pin is able to at least partially rotate within the enlarged portion of the first shaped opening.

Normally the first shaped opening is disposed in substantially the same general direction as the opening of the hook. Preferably the entry of the first shaped opening is disposed in a direction substantially the same as would be traced by the first retaining pin when the shuttle is pivoting by the second retaining pin (when the second retaining pin is rotating relative to the enlarged portion of the second shaped opening).

In one embodiment, the second shaped opening includes an entry of a first dimension and an enlarged portion of a second dimension. Preferably the second dimension is larger than the first dimension. Typically the enlarged portion of the second shaped opening is circular in shape when viewed from the side to enable smooth rotation of the second retention pin (of the shuttle) relative to the enlarged portion. Typically the second shaped opening is located towards the point on the internal surface side of the body.

Alternatively the enlarged portion of the second shaped opening may be of any suitable shape. A skilled addressee will understand that any suitable shaped enlarged portion of the second shaped opening may be used provided that the second retention pin is able to at least partially rotate within the enlarged portion of the second shaped opening. Normally the second shaped opening is disposed in direction substantially opposed to the general direction of the opening of the hook. Preferably the entry of the second shaped opening is disposed in a direction substantially the same as would be traced by the second retaining pin when the shuttle is pivoting by the first retaining pin (when the first retaining pin is rotating relative to the enlarged portion of the first shaped opening).

In another embodiment, the body of the hook comprises a retaining means to resist the disengagement of the first retaining pin from the first shaped opening, unless a predetermined force is applied to the shuttle. Typically, the retaining means is in the form of a notch. The notch is usually operatively engageable with a detent (operatively engaged to the shuttle) to resist the disengagement of the first retaining pin from the first shaped opening, unless a predetermined force is applied to the shuttle. Alternatively, other retaining means which are known in the art can be utilised. For example, a detent may be provided on the body of the hook which is operatively engageable with a notch (operatively engaged to the shuttle). No particular limitation should be placed on the invention by the type of retaining means used, provided that the retaining means is adapted to resist the disengagement of the first retaining pin from the first shaped opening, unless a predetermined force is applied to the shuttle. Typically, the retaining means is located in proximity to the first shaped opening. Preferably a notch is located on the internal side of the body towards the first shaped opening. The notch is typically sized to be operatively engageable to a detent (operatively engaged to the shuttle).

Alternatively, the body may comprise a magnet and/or magnetic material to resist the disengagement of the first retaining pin from the first shaped opening, unless a predetermined force is applied to the shuttle (i.e. the first retaining pin may be magnetic, magnetized, metallic and/or the like). It will also be appreciated that this type of arrangement may also be applied to resist the disengagement of the second retaining pin from the second shaped opening, unless a predetermined force is applied to the shuttle. It will also be appreciated that if this type of arrangement is provided, the magnet(s) and/or magnetic material will be located in proximity to the first and/or second shaped opening.

In one embodiment, the body comprises at least one projection to prevent excess rotation of shuttle when the shuttle is rotating about the axis of the second retaining pin relative to the second shaped opening.

In another embodiment, the shuttle comprises a spacing body. Typically the spacing body is elongate. Normally the spacing body is substantially the same length as the dimension between the first shaped opening and the second shaped opening. The spacing body may be of any suitable shape provided that a stable surface is provided against which an object may abut. The spacing body comprises at least one spacing member. In a preferred embodiment, the spacing body comprises two spacing members spaced apart by the first retention pin, the second retention pin, a biasing member and/or an attachment means.

Typically, the length of the shuttle will be less than the throat of the opening defined by the body. Preferably, the shuttle will be substantially the same length as the gape of the opening. Typically, providing an opening with a throat, the dimension of which is longer than the dimension of the gape enables larger objects to be "grabbed".

In one embodiment, the first retaining pin may be of any suitable shape. A skilled addressee will understand that any suitable first retaining pin may be used such as a retaining pin with a rectangular, oval, lozenge, ellipse, sector, segment cross section and/or the like, provided that the first retention pin is shaped to pass the entry of the first shaped opening when oriented in a first position and to be prevented passage when not in the first position. In a preferred embodiment, the cross-sectional shape of the first retaining pin is substantially similar to a circle with a circular segment removed. Alternatively, if the body comprises a magnet and/or magnetic material to resist the disengagement of the first retaining pin from the first shaped opening, unless a predetermined force is applied to the shuttle, the cross-sectional shape of the first retaining pin may be circular. The first retaining pin is typically formed with or engages with the spacing body. In a preferred embodiment, the first retaining pin is disposed between two spacing members of the spacing body.

In another embodiment, the second retaining pin may be of any suitable shape. A skilled addressee will understand that any suitable second retaining pin may be used such as a retaining pin with a rectangular, oval, lozenge, ellipse, sector, segment cross section and/or the like, provided that the second retaining pin is shaped to pass the entry of the second shaped opening when oriented in a first position and to be prevented passage when not in the first position. In a preferred embodiment, the cross-sectional shape of the second retaining pin is substantially similar to a circle with a circular segment removed, or. D-shaped. Alternatively, if the body comprises a magnet and/or magnetic material to resist the disengagement of the second retaining pin from the second shaped opening unless a predetermined force is applied to the shuttle, the cross-sectional shape of the second retaining pin may be circular. The second retaining pin is typically formed with or engages with the spacing body. In a preferred embodiment, the second retaining pin is disposed between two spacing members of the spacing body.

In one embodiment, the shuttle is preferably adapted to rotate about the axis of the first retaining pin when the first retaining pin is retained in the first shaped opening. The shuttle is preferably adapted to rotate about the axis of the second retaining pin when the second retaining pin is retained in the second shaped opening.

In another embodiment, the shuttle typically comprises a biasing member such that when the first retaining pin is retained in the first shaped opening, the shuttle is biased towards a closed position (this can also be referred to as a first position, where the first retaining pin is retained in the first shaped opening and the second retaining pin is retained in the second shaped opening). Normally when the shuttle is in the closed position, it is disposed towards the gape of the opening defined by the body. Typically the biasing member is in the form of a spring which is operatively engageable with the body of the hook. Normally the spring is a flat spring. However, other means to achieve the same results are envisaged including the use of (a) magnet(s), resilient material, torsional engagement between the first retaining pin and the shuttle and/or the like. In a preferred embodiment, the detent is typically formed with or engages with the spring.

In one embodiment, the shuttle normally comprises an attachment means to attach a line to the shuttle. The attachment means may be of any suitable shape. A skilled addressee will understand that any suitable attachment means may be used such as a tab, ring, constriction, aperture, clip, clamp, hold down, hook, latch, lug, pin, adhesive portion, magnetic portion and/or the like. Typically, the attachment means comprises an aperture. In a preferred embodiment, the attachment means is a tab with an aperture. The tab may be rigid but will typically be flexible. Preferably, the aperture is a bi-lobular aperture. Normally, the bi-lobular aperture comprises a first lobe and a second lobe, the first lobe being of a larger dimension than the second lobe. Typically, to attach a line to an attachment means which comprises a bilobular aperture, the line will have an enlargement (eg a knot), this enlargement is passed through the larger of the two lobes, the line then passes the constriction of the bilobular aperture. Typically the line will be deformable to pass the constriction of the bilobular aperture. Alternatively, the constriction of the bilobular aperture may be deformable. Typically the enlargement of the line will be of a larger dimension than the second lobe, securing the line in the second lobe.

In use, the hook of the present invention is normally prepared such that the shuttle is disposed across an opening of the hook (i.e. the first retaining pin is retained in the first shaped opening and the second retaining pin is retained in the second shaped opening). For example, across a gape of the opening of the hook. A line is typically attached to the shuttle. Normally the hook is then manipulated such that the shuttle is brought against an object (for example a dock fitting) and a predetermined amount of force is applied such that the shuttle moves from the first position towards a second position (where the first retaining pin is retained in the first shaped opening and the second retaining pin is disengaged from the second shaped opening) such that at least part of the object enters the opening defined by the hook. Typically, the shuttle is biased into the first position such that once at least part of the object has sufficiently entered the opening and is no longer in contact with the shuttle, the shuttle moves into the first position. Normally once this has occurred, the hook is manipulated such that the shuttle is brought against the object (eg. from a substantially opposed side relative to the first time the shuttle was brought against the object) and a predetermined amount of force is applied such that the shuttle moves from the first position towards a third position (where the second retaining pin is retained in the second shaped opening and the first retaining pin is disengaged from the first shaped opening). Normally, the at least part of the object that was in the opening defined by the hook is now able to exit the opening and the line is effectively 'threaded' around at least part of the object. As an example, using the hook attached to a sufficiently long handle, a line can be threaded around (or through) a dock fitting by a user on a boat without requiring the user to set foot on the dock, the end of the line that was threaded around (or through) the dock fitting is then brought back to the boat and the line can be tied off on the boat, in this situation, casting off is also made much easier and safer, as the line can be untied and pulled around (or through) the dock fitting without requiring a user to untie the line on the dock and then jump onto the boat.

The hook can also be prepared such that the shuttle is disposed across an opening of the hook (i.e. the first retaining pin is retained in the first shaped opening and the second retaining pin is retained in the second shaped opening) but without attaching a line. In this configuration, the hook can be used to pick up or capture other implements as the free end of the hook can catch the implements, determined movement of the hook against the implement will temporarily dislodge the second retaining pin is from the second shaped opening but where the first retaining pin is retained in the first shaped opening and such that at least part of the object enters the opening defined by the hook, whereupon the hook can be manipulated to re-engage the second retaining pin in the second shaped opening securing the implement within the hook.

The components of the hook and shuttle are normally made of a suitable composite material. Alternatively the components may be made from an alloy, plastic, polymer, ceramic, metallic and/or any material according to a suitable materials selection chart. In a preferred embodiment of the invention some or all of the components of the hook and shuttle additionally include a luminescent material. For example, the hook may be made from a high-strength engineered plastic which includes a luminescent material. One advantage of including a luminescent material is that the book can be easily seen and manipulated in lowlight conditions. In another preferred embodiment, some or all of the components of the hook and shuttle are predominantly made from Ultra-High Molecular Weight Polyethylene (UHMwPE), for example using the Dyneema product sold by Royal DSM N.V.

In another aspect, the present invention provides an extendable handle for use with a hook as claimed in any one of the proceeding claims, the handle comprising a first handle member, a second handle member at least partially disposed within the first handle member and slideably movable relative thereto, a third handle member at least partially disposed within the second handle member and slideably movable relative thereto, and a line operatively engaged with the first handle member, the second handle member and the third handle member, wherein when the second handle member is extended relative to the first handle member, the line moves relative to the second handle member, causing extension of the third handle member relative to the first and second handle members and when the second handle member is retracted relative to the first handle member, the line moves relative to the second handle member, causing retraction of the third handle member relative to the first and second handle members.

In one embodiment, the first handle member is typically elongate and substantially hollow. The first handle member may be of any suitable shape provided that the second handle member is adapted to be at least partially slideably received therein. Preferably, the first handle member is between 1 meter and 1.5 meters in length. No particular limitation should be placed on the invention by the length of the first handle member.

In another embodiment, the second handle member is typically elongate and substantially hollow. The second handle member may be of any suitable shape provided that the third handle member is adapted to be at least partially slideably received therein. Preferably, the second handle member is between 1 meter and 1.5 meters in length. No particular limitation should be placed on the invention by the length of the second handle member. Typically, the second handle member comprises a handle to enable manipulation (i.e. movement) of the second handle member relative to the first handle member. The handle is typically formed with or engages with the second handle member. In a preferred embodiment, the handle is a push-pull type handle which extends from the second handle member.

In one embodiment, the third handle member is typically elongate and substantially hollow. The third handle member may be of any suitable shape. Any suitably shaped third handle member may be used provided that the third handle member is adapted to be at least partially slideably received within the second handle member. In a preferred embodiment, the third handle member is between 1 meter and 1.5 meters in length. No particular limitation should be placed on the invention by the length of the third handle member.

In another embodiment, the line may be operatively engaged with the first handle member, the second handle member and the third handle member.

Normally, the line is attached to the first handle member towards a first end thereof.

The line is typically operatively engaged with the second handle member towards a second end thereof. Normally the operative engagement of the line with the second handle member towards the second end thereof is a pulley type arrangement. Preferably a pulley is rotatably mounted relative to the second handle member towards the second end thereof and the line operatively engages with the pulley. Alternatively the operative engagement of the line with the second handle member towards the second end thereof may be a sliding type arrangement. Typically if a pulley is rotatably mounted to the second handle member towards the second end thereof, the pulley is mounted on an intermediate support member. Normally, the intermediate support member is an elongate member formed with or engaged to the second handle member. The intermediate support member is preferably disposed within the intermediate support member. Preferably the intermediate support member is at least partially receivable within the third handle member.

Typically, the line is attached to the third handle member towards a first end thereof.

Typically, the line is operatively engaged with the second handle member towards a first end thereof. Normally the operative engagement of the line with the second handle member towards the first end thereof is a pulley type arrangement. Preferably a pulley is rotatably mounted to the second handle member towards the first end thereof and the line operatively engages with the pulley. Alternatively the operative engagement of the line with the second handle member towards the first end thereof may be a sliding type arrangement. Typically, the line is attached to the first handle member towards a second end thereof.

In a preferred embodiment, the first end of the line is attached towards the first end of the first handle member, the line then engages with a pulley rotatably mounted relative to the second handle member towards the second end thereof, the line is then attached to the third handle member towards the first end thereof, the line then engages with a pulley rotatably mounted relative to the second handle member towards the first end thereof, the second end of the line is then attached towards the second end of the first handle member.

In one embodiment, preferably an engagement mechanism is disposed between the first handle member and the second handle member such that the extendable handle can be 'locked' into position. Typically, the engagement mechanism is a toothed section formed with or engaged with the second handle member and an engagement member formed with or engaged with the first handle member. However, other means to achieve the same results are envisaged including the use of (a) clip(s), locking ring(s), friction fit and/or the like. Alternatively the engagement mechanism may be disposed between the second handle member and the third handle member.

In use, typically when the second handle member is extended relative to the first handle member, the line at the point where it is attached towards the first end of the third handle member is 'pulled' (due to the line being attached to the first handle member towards the first end thereof) towards where the line is operatively engaged with the second handle member towards the second end thereof, causing extension of the third handle member relative to the first and second handle member. Typically when the second handle member is retracted relative to the first handle member, the line at the point where it is attached towards the first end of the third handle member is 'pulled' (due to the line being attached to the first handle member towards the second end thereof) towards where the line is operatively engaged with the second handle member towards the first end thereof, causing retraction of the third handle member relative to the first and second handle member.

In a preferred embodiment, the first handle member, the second handle member and the third handle member define a conduit through which fluid may pass. For example, a seal may be provided between the first handle member and the second handle member, and a seal may also be provided between the second handle member and the third handle member such that fluid provided to the first handle member may flow through the second handle member and the third handle member and exit the third handle member through an opening therein (i.e. the seals are provided to prevent fluid from seeping out between the first handle member and the second handle member and the second handle member and the third handle member). Preferably, the first handle member is adapted to attach to a source of fluid. For example the first handle member may be adapted to attach to a hose which can supply fluid.

The components of the extendable handle are normally made of a suitable composite material. Alternatively the components may be made from an alloy, plastic, polymer, ceramic, metallic and/or any material according to a suitable materials selection chart. In a preferred embodiment of the invention some or all of the components of the extendable handle are predominantly made from Ultra-High Molecular Weight Polyethylene (UHMwPE), for example using the Dyneema product sold by Royal DSM N.V. Preferably the components are made from a non-conductive material. The benefit of making the components from a non-conductive material is that the risk of electrocution is minimised when the extendable handle is used near sources of electricity and that electrocution danger labels may not be required.

In a further aspect, the present invention provides a hook for manipulation of lines, the hook comprising a body, the body defining an opening between at least two portions thereof, the body further comprising a first shaped opening including an entry of a first dimension and a portion of a second dimension, a second shaped opening including an entry of a first dimension and a portion of a second dimension, the respective entries to the first and second shaped openings oriented in different directions, the hook further comprising a shuttle including a first retention pin, a second retention pin and a spacing body to space the first retention pin and the second retention pin from one another, the first retention pin adapted to resist disengagement from the first shaped opening, unless a predetermined force is applied to the shuttle and the second retention pin adapted to resist disengagement from the first shaped opening, unless a predetermined force is applied to the shuttle.

Some benefits of the hook and/or extendable handle of the present invention may include the following:
1. Construction simplification;
2. Improved reliability;
3. Durability;
4. Ease of assembly;
5. Ability to operate under most conditions;
6. Safer and easier operation;
7. Less or no fasteners required; and
8. An overall reduction in costs;

BRIEF DESCRIPTION OF THE DRAWINGS

One or more preferred embodiments of the invention will now be described, by way of example only, with reference to the accompanying drawings in which:

FIG. 9 is a schematic section view of a variable angle attachment mechanism.

FIG. 10 is a schematic section view of a variable angle attachment mechanism.

FIG. 11 is a schematic section view of a variable angle attachment mechanism.

FIG. 12 is a schematic section view of a variable angle attachment mechanism.

FIG. 13 is a schematic section view of a neck section of a hook.

BEST MODE

Figure 1:
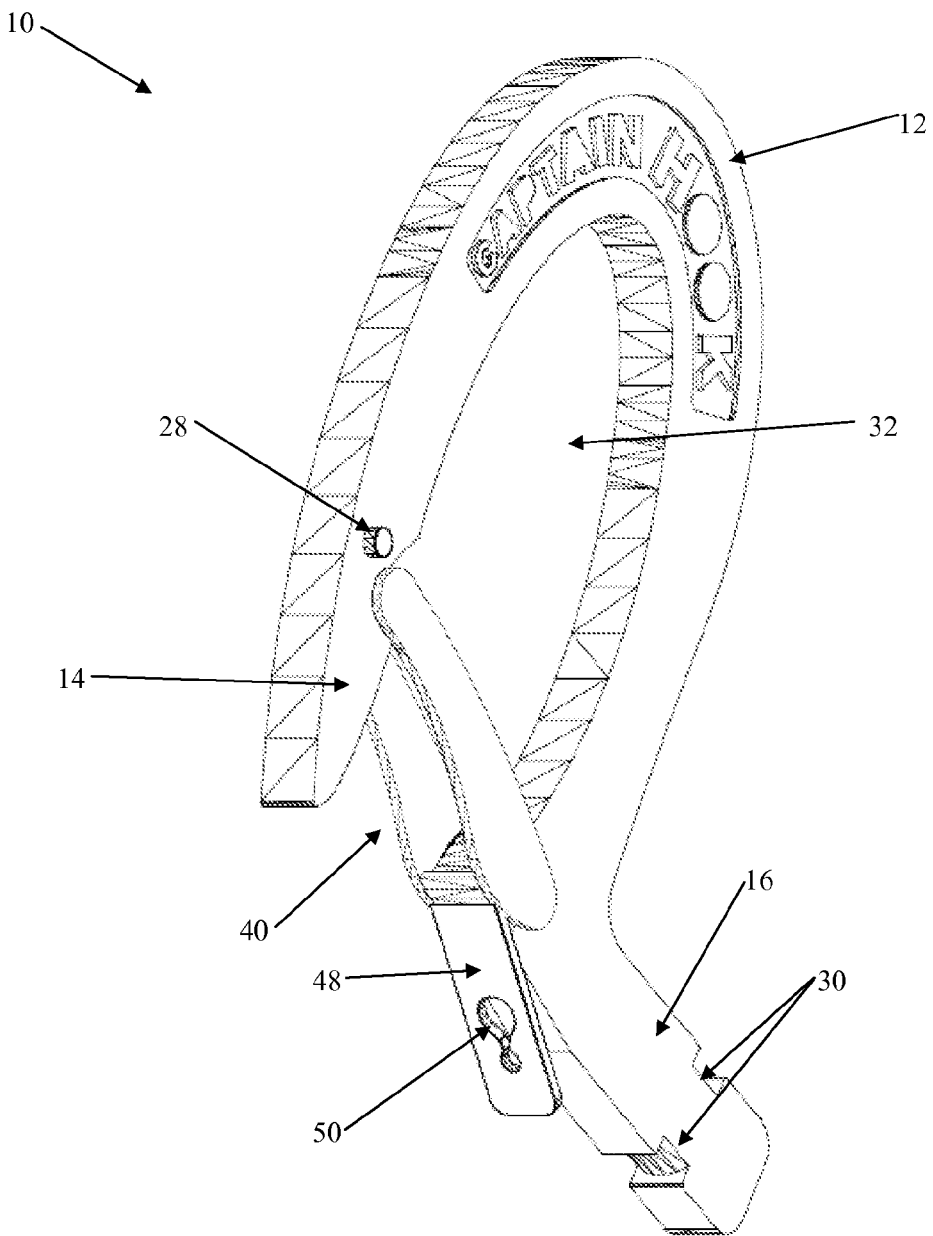
FIG. 1 is an isometric view of a hook with a shuttle in a first position.
Figure 2:
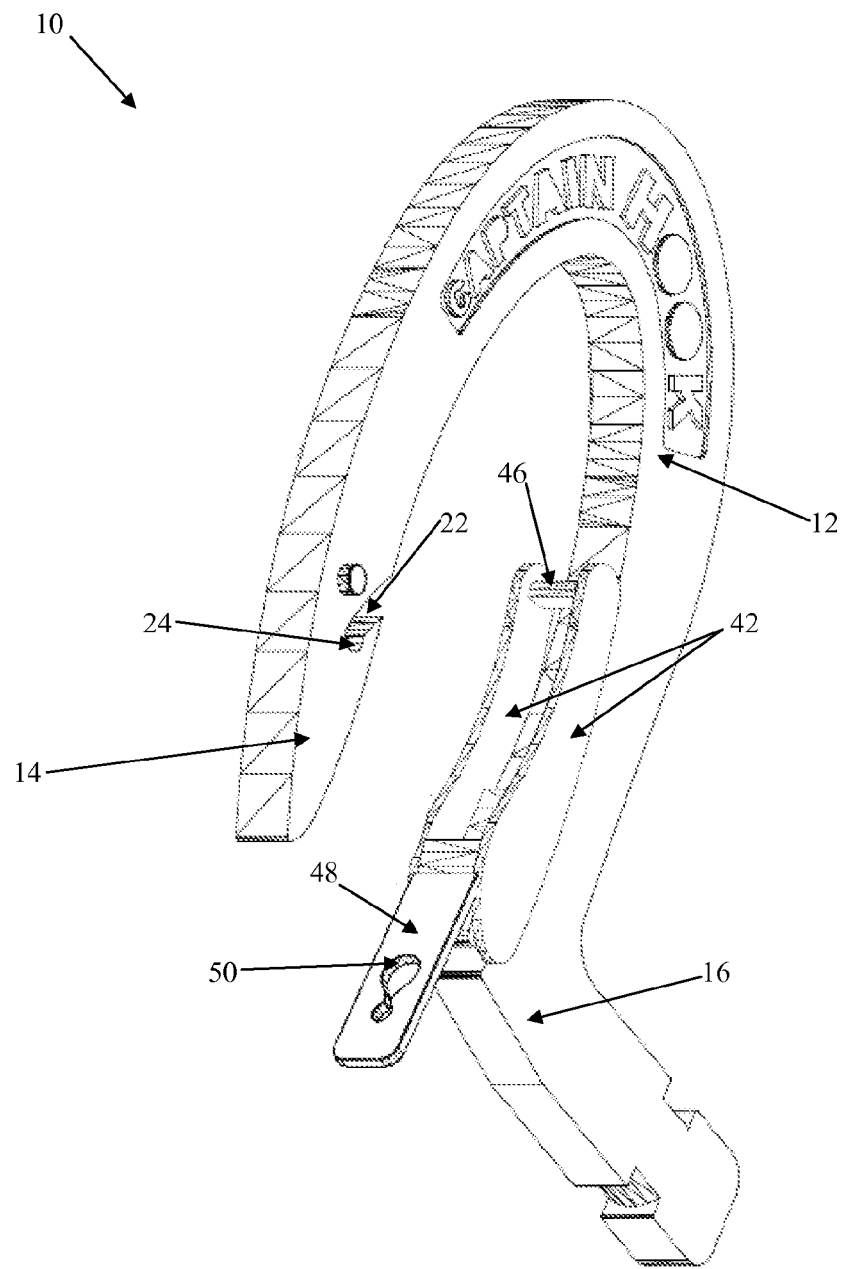
FIG. 2 is an isometric view of a hook with a shuttle in a second position.
Figure 3:
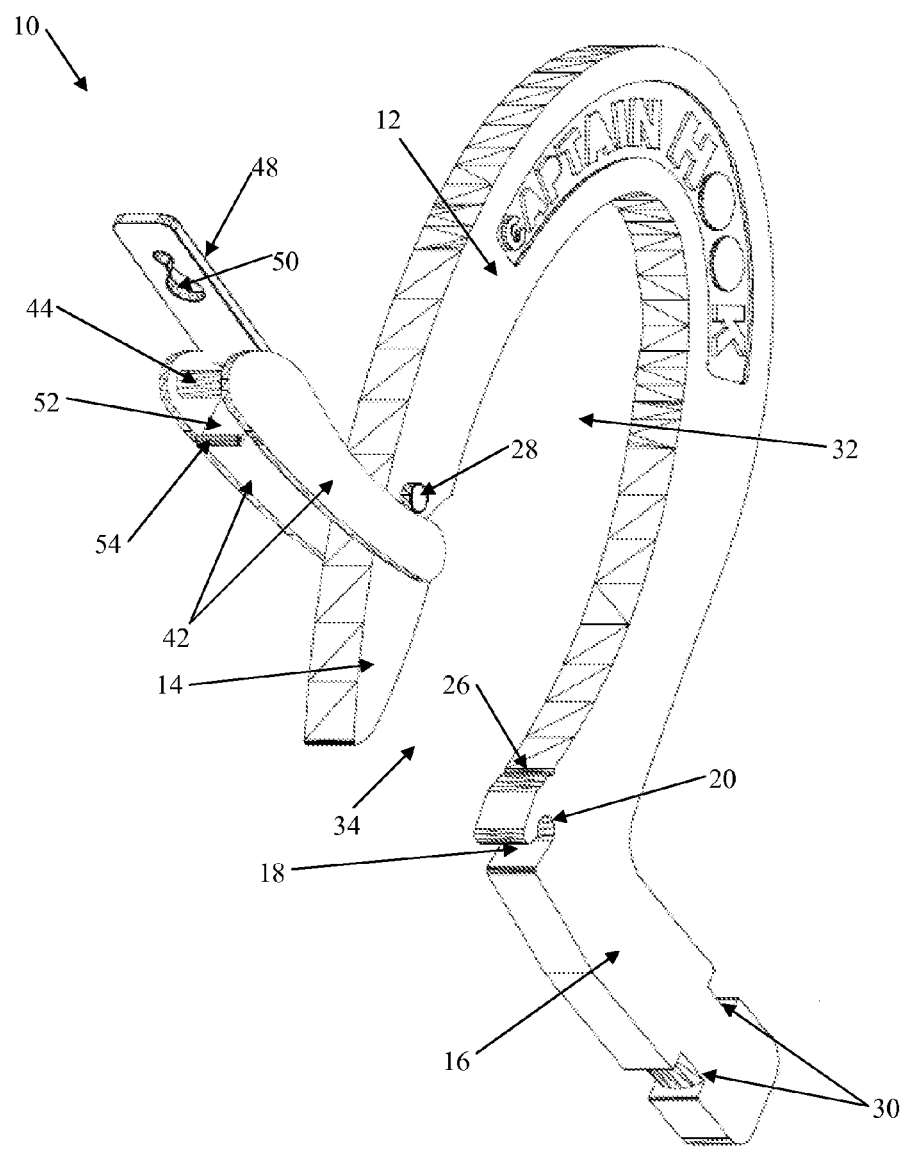
FIG. 3 is an isometric view of a hook with a shuttle in a third position.

With reference to FIGS. 1-3, there is shown a hook 10, the hook has a body 12 defining an opening 32 and an entry 34 to the opening 32. The body 12 further comprises an elongate point 14 and a neck portion 16. The hook 10 also includes a first shaped opening in the form of a first shaped opening entry 18 and a first shaped opening enlarged portion 20. The hook 10 also includes a second shaped opening in the form of a second shaped opening entry 22 and a second shaped opening enlarged portion 24. The hook 10 also includes projections 28 (the use of which will be explained in further details below). The hook 10 further includes a retaining means in the form of a notch 26 (the use of which will be explained in further details below). The neck portion 16 includes a hook attachment means in the form of a constriction 30. Typically, the neck portion 16 attaches to a handle (not shown). Alternatively, the neck portion 16 can attach to an intermediate section (not shown) which attaches to a handle (not shown).

The hook 10 is provided with a shuttle 40, in FIG. 1 the shuttle 40 is shown in a first position, in FIG. 2 the shuttle 40 is shown in a second position and in FIG. 3 the shuttle 40 is shown in a third position. The shuttle 40 comprises a spacing body in the form of two spacing members 42. The spacing members 42 are spaced apart by a first retaining pin 44 and a second retaining pin 46. The shuttle further comprises an attachment means in the form of a tab 48 and a biasing member in the form of a spring 52.

The first retaining pin 44 is shaped to pass the first shaped opening entry 18 when substantially oriented in a first direction (as seen in FIG. 1) and to be prevented passage when not oriented in a first direction (for example as seen in FIG. 2). The second retaining pin 46 is shaped to pass the second shaped opening entry 22 when substantially oriented in a first direction (as seen in FIG. 1) and to be prevented passage when not oriented in a first direction (for example as seen in FIG. 3). The cross-sectional shape of the first and second retaining pins 44, 46 is substantially similar to a circle with a circular segment removed. It can also be seen from the figures that the first retaining pin 44 is also adapted to rotate within the first shaped opening enlarged portion 20 and that the second retaining pin 46 is also adapted to rotate within the second shaped opening enlarged portion 24.

The tab 48 is used to attach a line (not shown) to the shuttle 40. The tab 48 has an aperture in the form of a bilobular aperture 50, which has one lobe larger than the other lobe. The bilobular aperture 50 enables a line (not shown) (for example a rope with an enlargement at one end such as a knot) to be threaded through the larger lobe, and secured by the smaller lobe.

The spring 52 biases the shuttle 40 towards the first position, when the shuttle 40 is between the first position and the second position inclusive. The spring 52 further comprises a detent 54, which engages with the notch 26 (when the shuttle 40 is in the first position) to resist disengagement of the first retaining pin 44 from the first shaped opening enlarged portion 20 unless a predetermined force is applied to the shuttle 40.

The projections 28 prevent the shuttle 40 from rotating further than the third position (i.e. further than from the first position to the third position) by abutting the spacing members 42 when the shuttle 40 is in the third position.

Figure 4:
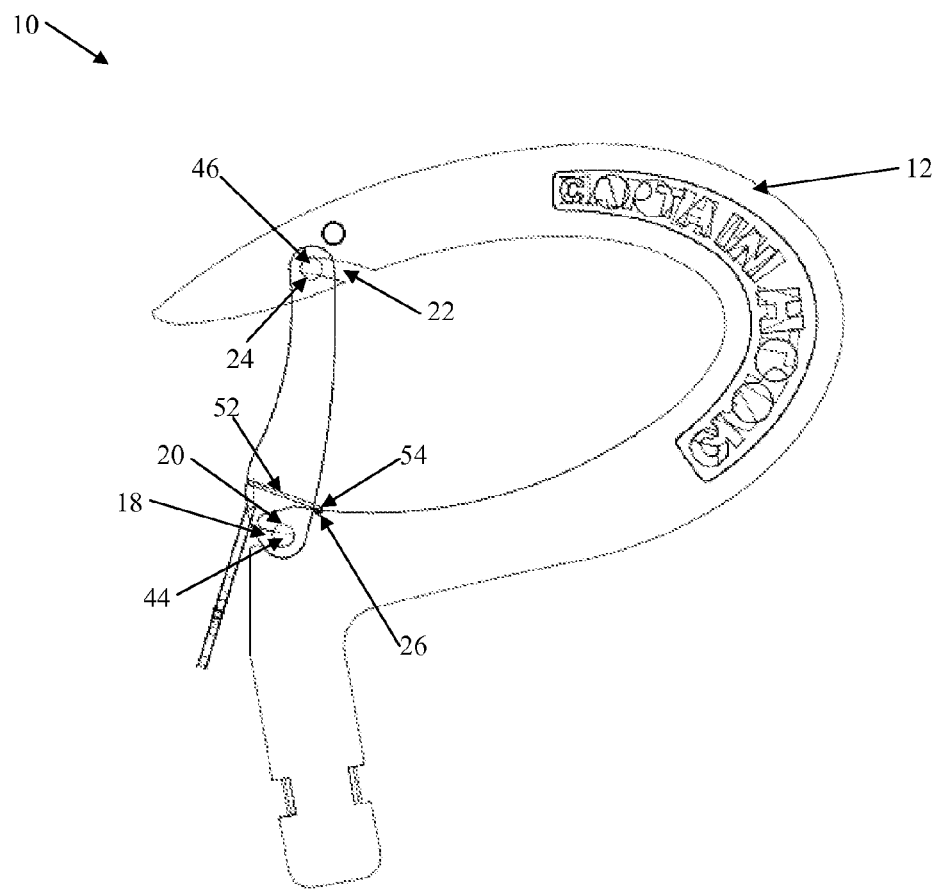
FIG. 4 is an 'x-ray' view of a hook with a shuttle in a first position.
Figure 5:
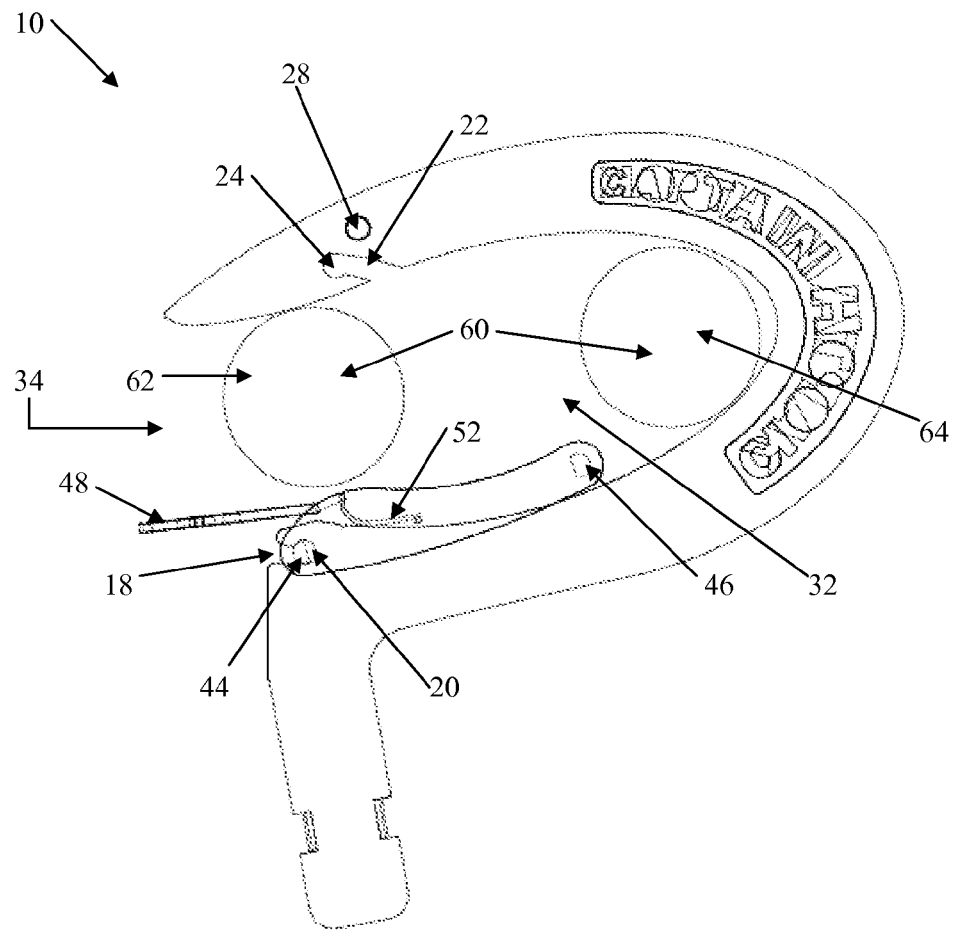
FIG. 5 is an 'x-ray' view of a hook with a shuttle in a second position.
Figure 6:
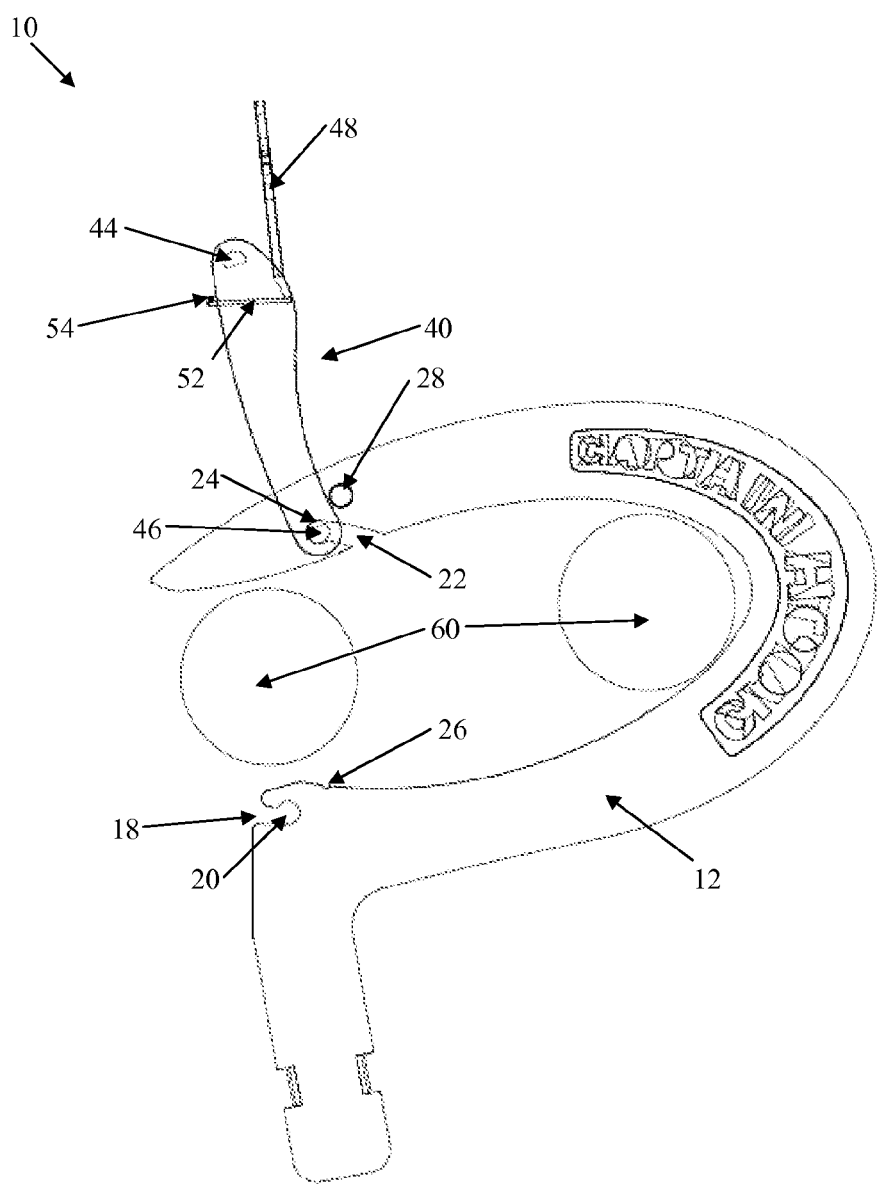
FIG. 6 is an 'x-ray' view of a hook with a shuttle in a third position.

With reference to FIGS. 4-6, there is shown the hook 10 in use. Initially the shuttle 40 is in the first position (as shown in FIG. 4). As can be seen in FIG. 4, when the shuttle 40 is in the first position, the first retaining pin 44 is substantially oriented in the first direction such that it can pass the first shaped opening entry 18, and the second retaining pin 46 is substantially oriented in the first direction such that it can pass the second shaped opening entry 22. The spring 52 biases the shuttle 40 towards the first position (i.e. where the second retaining pins 46 is in the second shaped opening enlarged portion 24), in this position the detent 54 engages with the notch 26 to resist disengagement of the first retaining pin 44 from the first shaped opening enlarged portion 20 (unless a predetermined force is applied to the shuttle 40). Normally a line (not shown) would be attached to the tab 48.

As can be seen in FIG. 5, to thread a line (not shown) around an object 60, the shuttle 40 is pushed (in relative terms) against the object 60 (in an entry position 62 for example), this moves the shuttle 40 from the first position towards the second position (as shown in FIG. 5), once the object 60 is no longer in contact with the shuttle 40 (for example in a captured position 64) the spring 52 biases the shuttle 40 into the first position (as seen in FIG. 4). As can be seen in FIG. 6, the shuttle 40 can then be pushed against the object 60 (i.e. relative movement of the object 60 from the captured position 64 to an exit position 66) with enough force to overcome the engagement between the detent 54 and the notch 26, causing the shuttle 40 to move from the first position towards a third position (as shown in FIG. 6). It will be apparent that a line (not shown) attached to the tab 48 will now have been effectively threaded around the object 60.

Figure 6C:
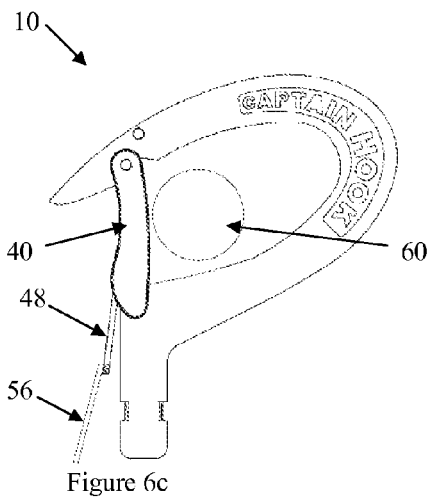
FIG. 6c is a side view of the hook shown in a third stage of use.
Figure 6B:
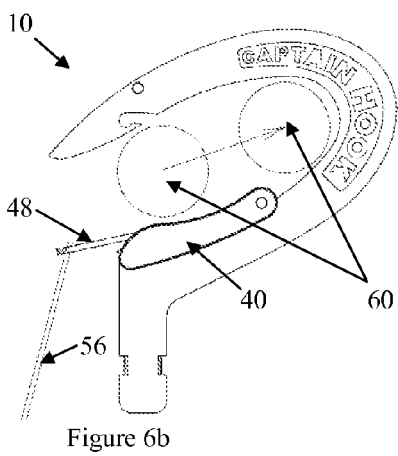
FIG. 6b is a side view of the hook shown in a second stage of use.
Figure 6E:
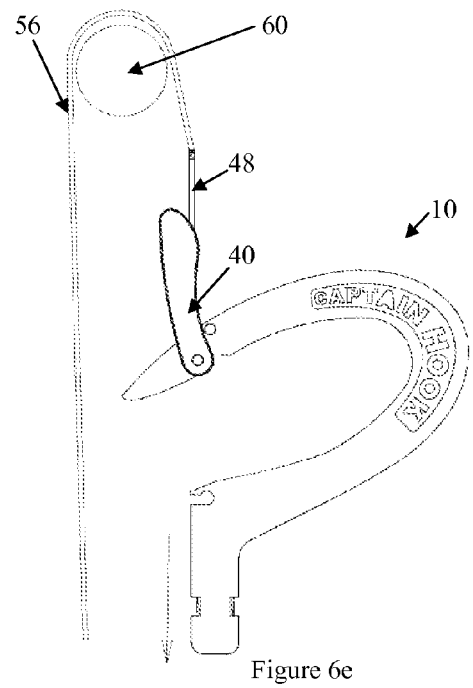
FIG. 6e is a side view of the hook shown in a second stage of capturing an object.
Figure 6A:
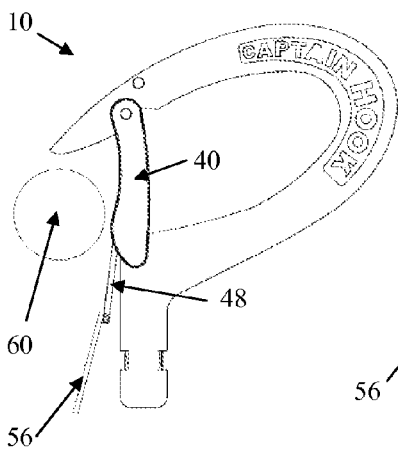
FIG. 6a is a side view of the hook shown in a first stage of use.
Figure 6D:
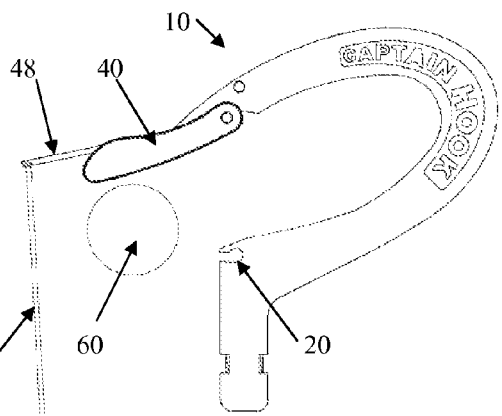
FIG. 6d is a side view of the hook shown in a first stage of capturing an object.

With reference to FIGS. 6a-6e, there is shown the hook 10 in use, with a line 56 attached to the tab 48. Step 1, as shown in FIG. 6a is to bring the object 60 into contact with the shuttle 40, Step 2 is to capture the object 60 (as shown in FIG. 6b), once the object 60 is no longer in contact with the shuttle 40 the shuttle 40 is biased into the first position (as seen in FIG. 6c). In step 3 (as seen in FIG. 6c), the object 60 is brought 'back' towards the shuttle 40. In step 4 (as seen in FIG. 6d), the object 60 is pushed against the shuttle 40, such that the first retaining pin (not shown) is no longer retained in the first shaped opening enlarged portion 20. In step 5 (as seen in FIG. 6e), the hook 10 can then be moved away from the object 60, effectively threading the line 56 around the object 60 (or part thereof).

In some embodiments of the invention, the hook 10 may hollow, so as to increase its buoyancy. The hook 10 may also comprise an aperture (not shown) located at the rear of the hook 10, which is adapted to fit a plug (not shown), which may be screwed into the aperture. The plug may have means to hang the hook 10 on a rack or a shelf (not shown). The plug should have a watertight fit with the aperture, so as to prevent the ingress of water within the hollow hook.

In other embodiments of the invention, the hook 10 may be made of a material with a positive buoyancy. The hook 10 may also comprise means for hanging the hook 10 on a rack or a shelf.

Figure 7:
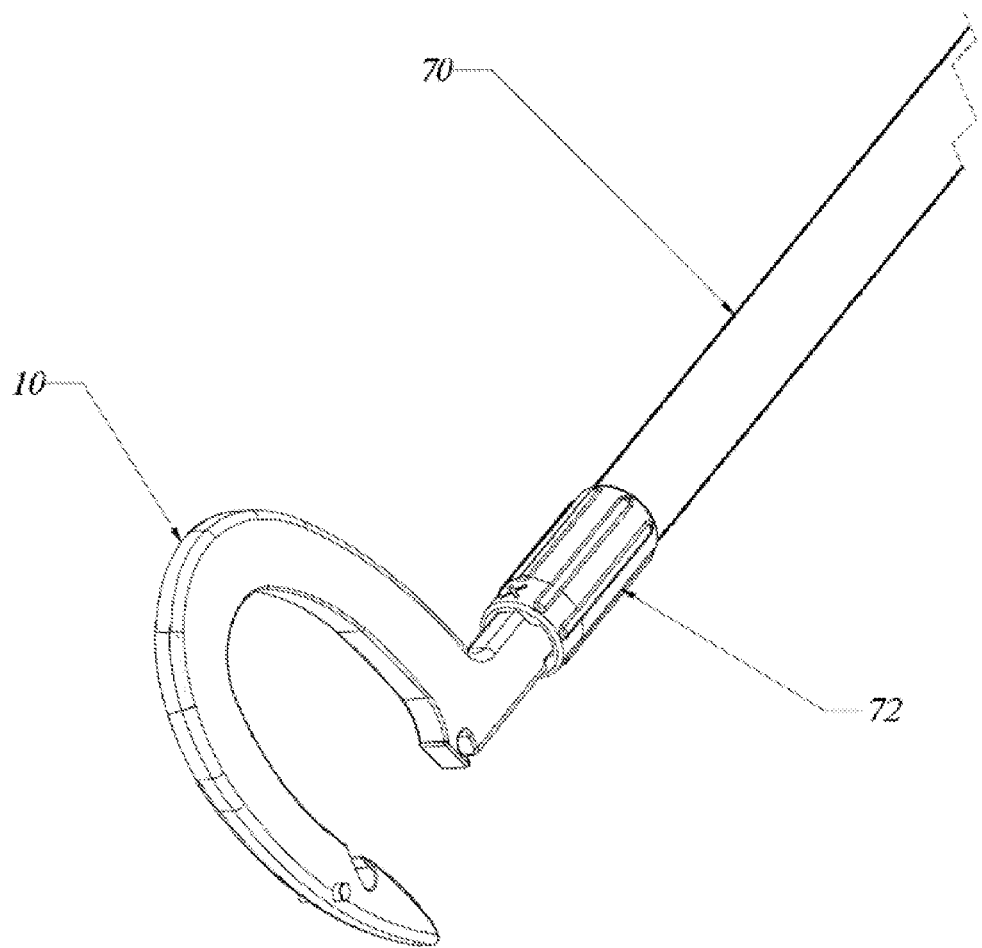
FIG. 7 is an isometric view of a hook attached to a handle.

With reference to FIG. 7, there is shown the hook 10 attached to a handle 70. A locking ring 72 is used to attach the hook 10 to the handle 70.

Figure 8:
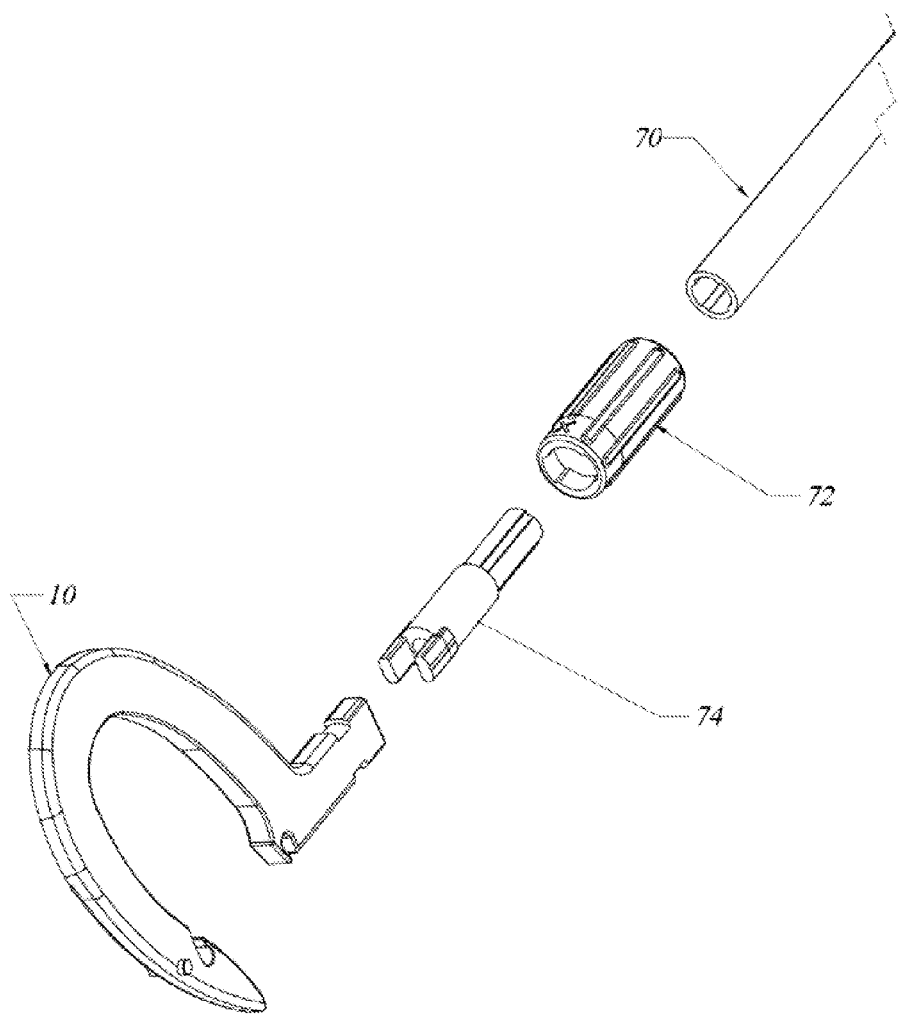
FIG. 8 is an exploded view of a hook and handle assembly.

With reference to FIG. 8, there is shown an exploded view of the hook and handle assembly. A handle insert 74 prevents the hook 10 from substantial rotation relative to the handle 70, when the hook 10 is attached to the handle 70 by the locking ring 72.

With reference to FIGS. 9-13, there is shown schematic views of a variable angle attachment mechanism 120 (an alternative to the hook of and handle assembly as shown in FIG. 8) between the hook 10 and the handle 70. The neck portion 16 is angled (the exact angle of the neck portion 16 can be chosen to suit the application) and inserted into the locking ring 72, such that in a first orientation (as shown in FIG. 9) the angle of the handle 70 relative to the general orientation of the hook(not shown) is substantially 0°. In this orientation, the constriction 30 engages with the detent 122. It can be seen from FIG. 9 that if the neck portion 16 is rotated 180° about its axis, the angle of the handle 70 relative to the general orientation of the hook (not shown) will be equivalent to the angle of the neck portion 16 in addition to the angle that the neck portion is inserted into the locking ring 72, It will also be appreciated that if the detent 124 is located at a different height relative to detent 122, that by rotating the locking ring 72 by 180° will result in a different angle of the handle 70 relative to the general orientation of the hook (not shown) relative to the locking ring 72 not being rotated. Detent 126 and detent 128 assist in positioning the neck portion 16 in the desired position. As can be seen from FIG. 10, the handle insert 74 prevents substantial axial rotation of the neck portion 16 relative to the handle 70. FIG. 11 shows a schematic axial cross section showing detent 124 operatively engaged with the neck portion 16 and detent 122 operatively engaged with the constriction 30 of the neck portion 16. FIG. 12 shows a schematic axial cross section showing detent 126 and detent 128 assist in the positioning of the neck portion 16. FIG. 13 shows a schematic axial cross section of the neck portion 16.

Figure 14:
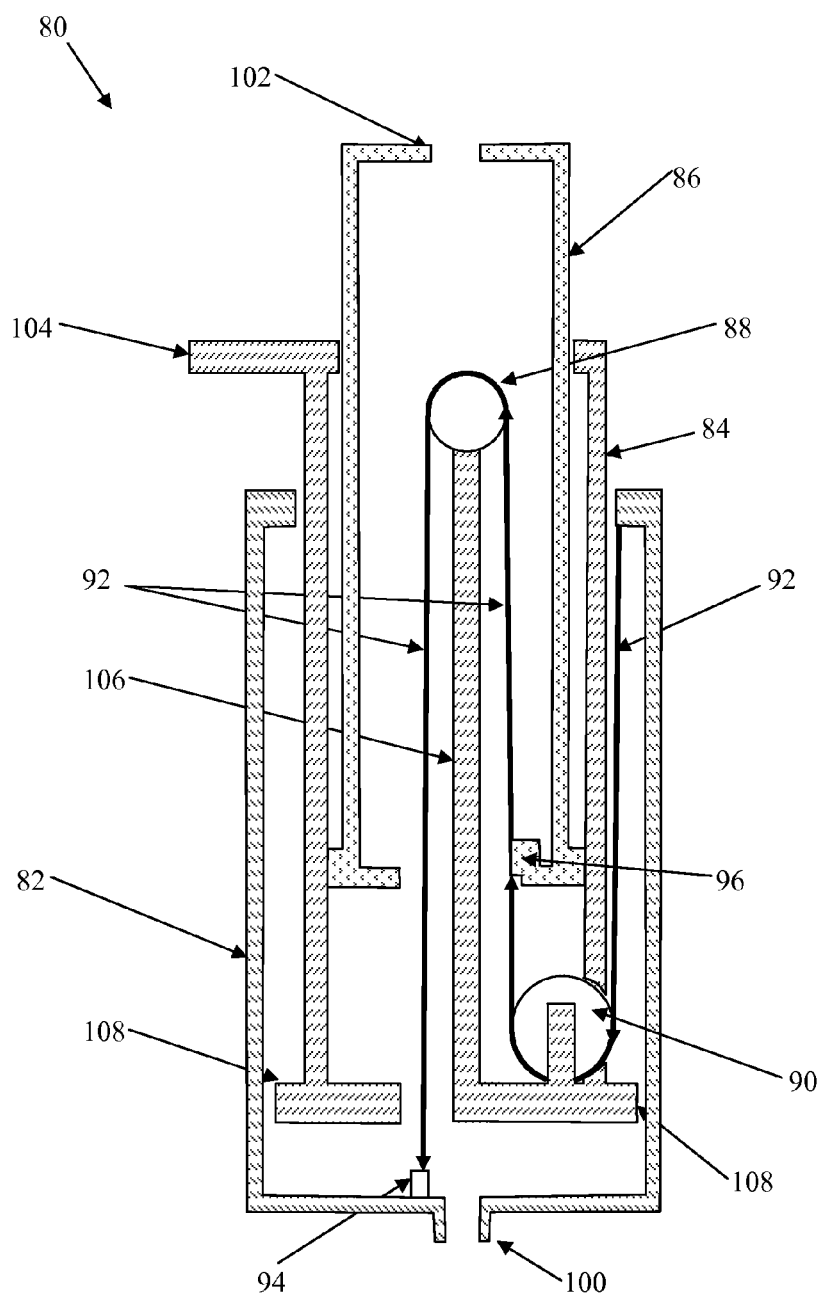
FIG. 14 is a schematic section view of an extendable handle.

With reference to FIG. 14, there is shown a schematic view of an extendable handle 80. The extendable handle 80 comprises a first handle member in the form of an outer rod 82. A second handle member in the form of an intermediate rod 84 is slideably mounted within the outer rod 82. A third handle member in the form of an inner rod 86 is slideably mounted within the intermediate rod 84. The outer rod 82 comprises a first opening and/or attachment means 100. The first opening and/or attachment means 100 may be used to attach to a hose and/or hose fitting (not shown). The intermediate rod 84 comprises an intermediate support member 106. A first pulley 88 is mounted on the intermediate support member 106 towards the top (as depicted in FIG. 9) of the intermediate rod 84. A second pulley 90 is mounted to the intermediate rod 84 towards the lower end(as depicted in FIG. 9) of the intermediate rod 84. A sealed 108 is provided towards the lower end(as depicted in FIG. 9) of the intermediate rod 84. A handle in the form of a push-pull handle 104 is provided to assist in the manipulation of the intermediate rod 84. The inner rod 86 comprises a second opening and/or attachment means 102. The second opening and/or attachment means 102 may be used to attach the extendable handle 80 to a hook (not shown), alternatively the second opening and/or attachment means 102 may be used to direct a fluid (not shown) which may be provided via the first opening and/or attachment means 100.

A line 92 is attached at a first attachment point 94 to the outer rod 82. The line 92 then engages with the first pulley 88. The line 92 is attached at a second attachment point 96 to the inner rod 86. The line 92 then engages with the second pulley 90. The line 92 is attached at a third attachment points to the outer rod 82. It will be apparent to a person skilled in the art that due to the engagement and/or attachment of the line 92 to the outer rod 82, intermediate rod 84 and inner rod 86, that movement of the intermediate rod 84 relative to the outer rod 82 will cause movement of the inner rod 86. For example, extension of the intermediate rod 84 (relative to the outer rod 82) will cause the second attachment point 96 to move towards the first pulley 88 and retraction of the intermediate rod 84 (relative to the outer rod 82) will cause the second attachment point 96 to move towards the second pulley 90. It will also be apparent that the line 92 is subject to tension during both extension and retraction of the extendable handle 80.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

In the present specification and claims (if any), the word "comprising" and its derivatives including "comprises" and "comprise" include each of the stated integers but does not exclude the inclusion of one or more further integers unless the context of use indicates otherwise.

Reference throughout this specification to "one embodiment", or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A hook for manipulation of lines, the hook comprising:
an aduncate body, the body defining an opening between at least two portions thereof, the body further comprising:
a first shaped opening including an entry of a first dimension and an enlarged portion of a second dimension, wherein the second dimension is larger than the first dimension;
a second shaped opening including an entry of a first dimension and an enlarged portion of a second dimension, wherein the second dimension is larger than the first dimension;
the respective entries to the first and second shaped openings oriented in different directions,
a shuttle including:
a first retention pin,
a second retention pin,
a spacing body to space the first retention pin and the second retention pin from one another,
a detent means to resist the disengagement of the first retention pin from the first shaped opening unless a predetermined force is applied to the shuttle,
the first retention pin shaped to pass the entry of the first shaped opening when oriented in a first position and to be prevented passage when not in the first position and the second retention pin shaped to pass the entry of the second shaped opening when oriented in a first position and to be prevented passage when not in the first position.

2. A hook as claimed in claim 1, wherein the shuttle further includes a biasing means to bias the shuttle into a first position when the shuttle is between the first position and a second position, wherein the biasing means is located close to one end of the shuttle and forms part of the detent means.

3. A hook as claimed in claim 1, wherein the body comprises at least one projection to prevent excess rotation of the shuttle when the shuttle is rotating about the axis of the second retention pin relative to the second shaped opening.

\* \* \* \* \*